(12) United States Patent
Chehab

(10) Patent No.: US 12,428,706 B2
(45) Date of Patent: Sep. 30, 2025

(54) PROCESS FOR MANUFACTURING AN ALUMINUM ALLOY PART

(71) Applicant: C-TEC CONSTELLIUM TECHNOLOGY CENTER, Voreppe (FR)

(72) Inventor: Bechir Chehab, Voiron (FR)

(73) Assignee: C-TEC Constellium Technology Center, Voreppe (FR)

( * ) Notice: Subject to any disclaimer, the term of this patent is extended or adjusted under 35 U.S.C. 154(b) by 728 days.

(21) Appl. No.: 17/258,652

(22) PCT Filed: Jul. 8, 2019

(86) PCT No.: PCT/FR2019/051685
§ 371 (c)(1),
(2) Date: Jan. 7, 2021

(87) PCT Pub. No.: WO2020/012098
PCT Pub. Date: Jan. 16, 2020

(65) Prior Publication Data
US 2021/0269896 A1    Sep. 2, 2021

(30) Foreign Application Priority Data

Jul. 9, 2018   (FR) ...................... 1870822

(51) Int. Cl.
*C22C 21/00* (2006.01)
*B22F 10/25* (2021.01)
(Continued)

(52) U.S. Cl.
CPC .............. *C22C 21/00* (2013.01); *B22F 10/25* (2021.01); *B22F 10/28* (2021.01); *B33Y 40/20* (2020.01);
(Continued)

(58) Field of Classification Search
CPC .......... B33Y 40/20; B22F 10/25; B22F 10/28; B22F 10/36; B22F 10/62; B22F 10/64;
(Continued)

(56) References Cited

U.S. PATENT DOCUMENTS 6,312,643 B1 * 11/2001 Upadhya ................. B22F 3/006
                                                        419/33
2014/0271322 A1 * 9/2014 Godfrey .................. B22F 10/28
                                                        419/25
(Continued)

FOREIGN PATENT DOCUMENTS

EP          0341714 A1    11/1989
JP          S6247449 A     3/1987
(Continued)

OTHER PUBLICATIONS

International Search Report of International Patent Application No. PCT/FR2019/051685 dated Nov. 15, 2019.
(Continued)

*Primary Examiner* — Alexandra M Moore
(74) *Attorney, Agent, or Firm* — McBee Moore & Vanik IP, LLC

(57) ABSTRACT

The invention relates to a process for manufacturing a part, involving forming consecutive solid metal layers ($20_1 \ldots 20_n$) that are stacked on top of one another, each layer describing a pattern defined on the basis of a numerical model {M}, each layer being formed by depositing a metal (25), referred to as filling metal, the filling metal being subjected to an input of energy so as to melt and constitute said layer upon solidifying, the filling metal being in the form of a powder (25) that is exposed to an energy beam (32), resulting in melting followed by solidification such that a solid layer ($20_1 \ldots 20_n$) is formed, the process being characterized in that the filling metal (25) is an aluminum alloy comprising at least the following alloying elements:

(Continued)

—Ni, in a moiety of 1 to 6%, preferably 1 to 5.5%, more preferably 2 to 5.5%; —Cr, in a moiety of 1 to 7%, preferably 3 to 6.5%; —Zr, in a moiety of 0.5 to 4%, preferably 1 to 3%; —Fe, in a moiety of no more than 1%, preferably between 0.05 and 0.5%, more preferably between 0.1 and 0.3%; —Si, in a moiety of no more than 1%, preferably no more than 0.5%. The invention also relates to a part obtained by said process. The alloy used in the additive manufacturing process according to the invention makes it possible to obtain parts with remarkable features.

20 Claims, 2 Drawing Sheets

(51) Int. Cl.
  *B22F 10/28*   (2021.01)
  *B33Y 40/20*   (2020.01)
  *B33Y 70/00*   (2020.01)
  *C22C 1/04*    (2023.01)
  *C22C 32/00*   (2006.01)
  *C22F 1/04*    (2006.01)
  *B22F 10/36*   (2021.01)
  *B22F 10/62*   (2021.01)
  *B22F 10/64*   (2021.01)
  *B22F 10/66*   (2021.01)

(52) U.S. Cl.
  CPC ............ *B33Y 70/00* (2014.12); *C22C 1/0416* (2013.01); *C22C 32/0047* (2013.01); *C22F 1/04* (2013.01); *B22F 10/36* (2021.01); *B22F 10/62* (2021.01); *B22F 10/64* (2021.01); *B22F 10/66* (2021.01); *B22F 2301/052* (2013.01)

(58) Field of Classification Search
  CPC .. B22F 10/66; B22F 2301/052; C22C 1/0416; C22C 21/00; C22C 32/0047; C22C 32/0052; C22C 32/0073; C22F 1/04
  See application file for complete search history.

(56) References Cited

U.S. PATENT DOCUMENTS

2017/0016096 A1    1/2017  Wentland et al.
2017/0314109 A1*  11/2017  McCloskey ............ B22F 10/64

FOREIGN PATENT DOCUMENTS

JP          02194102 A   *  7/1990
WO    WO-2019106305 A1  *  6/2019  ............ B22F 3/1055

OTHER PUBLICATIONS

French Search Report and Written Opinion of French Patent Application No. 1870822 dated Feb. 13, 2019.
Hatch, J E ED, "Aluminium, Properties and Physical Metallurgy, passage", Aluminum. Properties and Physical Metallurgy, Jan. 1, 1987, pp. 224-241, XP002441131.

* cited by examiner

[Fig. 1]
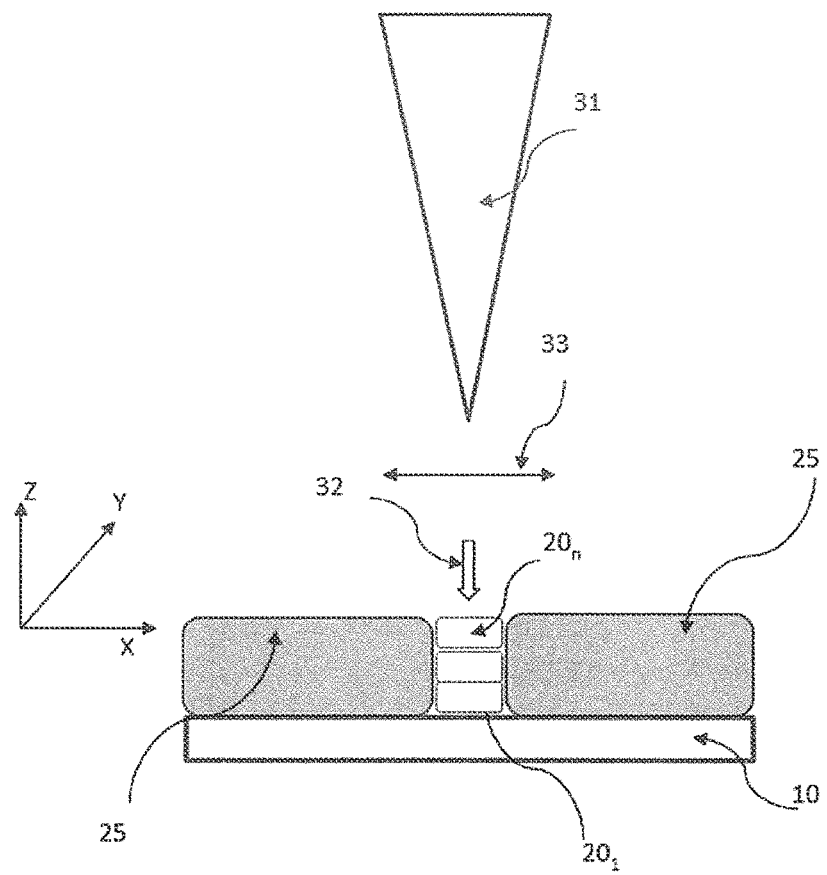
[Fig. 2]
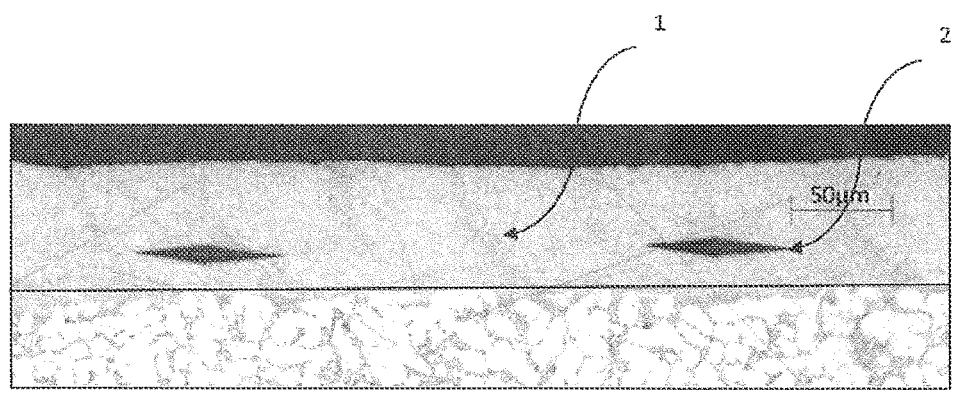

[Fig. 3]
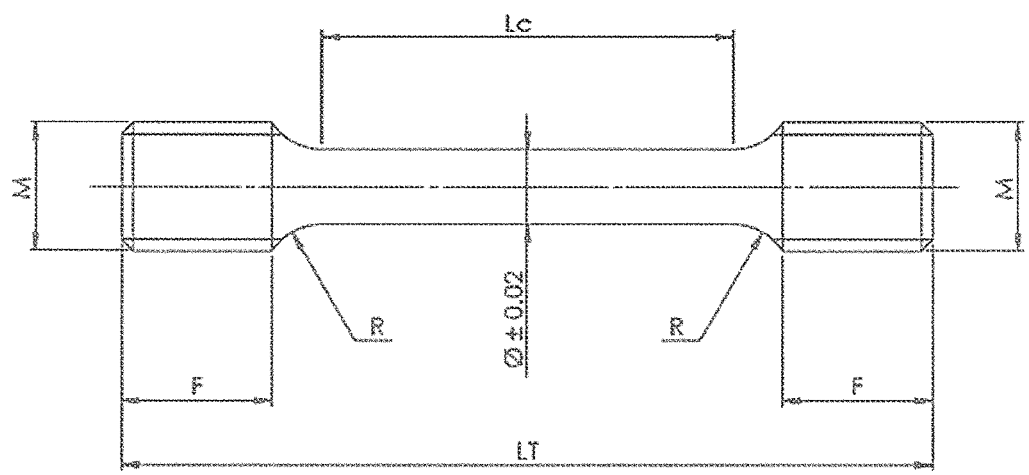

PROCESS FOR MANUFACTURING AN ALUMINUM ALLOY PART

CROSS-REFERENCE TO RELATED APPLICATIONS

This application is a National Stage entry of International Application No. PCT/FR2019/051685, filed 8 Jul. 2019, which claims priority to French Patent Application No. 1870822, filed 9 Jul. 2018.

BACKGROUND

Technical Field

The technical field of the invention is a method for manufacturing an aluminum alloy part, using an additive manufacturing technique.

Description of Related Art

Since the 1980s, additive manufacturing techniques have developed. They consist of forming a part by adding material, which is the opposite of machining techniques, which aim to remove material. Previously confined to prototyping, additive manufacture is now operational for the mass production of industrial products, including metal parts.

The term "additive manufacturing" is defined, in accordance with the French standard XP E67-001, as a "set of methods for manufacturing, layer by layer, by adding material, a physical object from a digital object". The standard ASTM F2792 (January 2012) also defines additive manufacturing. Various additive manufacturing methods are also defined and described in the standard ISO/ASTM 17296-1. Recourse to additive manufacturing for producing an aluminum part with low porosity was described in the document WO 2015/006447. The application of successive layers is generally effected by applying a so-called filler material, and then melting or sintering of the filler material by means of an energy source of the laser beam, electron beam, plasma torch or electric arc type. Whatever the additive manufacturing method applied, the thickness of each layer added is around a few tens or hundreds of microns.

An additive manufacturing means is the melting or sintering of a filler material taking the form of a powder. It may be a case of melting or sintering by an energy beam.

The techniques of selective laser sintering SLS or direct metal laser sintering DMLS are known in particular, wherein a layer of metal powder or metal alloy is applied to the part to be manufactured and is sintered selectively in accordance with the digital model with thermal energy from a laser beam. Another type of metal formation method comprises selective laser melting SLM or electron beam melting EBM, wherein the thermal energy supplied by a laser or directed beam of electrons is used for selectively melting (instead of sintering) the metal powder so that it melts as it cools and solidifies.

Laser melting deposition LMD is also known, wherein the powder is sprayed and melted by a laser beam simultaneously.

The patent application WO 2016/209652 describes a method for manufacturing an aluminum with high mechanical strength comprising: the preparation of an atomized aluminum powder having one or more required approximate powder sizes and an approximate morphology; the sintering of the powder in order to form a product by additive manufacturing; solution heat treatment; quenching; and aging of the aluminum manufactured additively.

The patent application EP 2796229 discloses a method for forming a metal aluminum alloy reinforced by dispersion comprising the steps consisting of: obtaining, in a powder form, an aluminum alloy composition that is able to acquire a microstructure reinforced by dispersion; directing a laser beam with low energy density onto a part of the powder having the composition of the alloy; removing the laser beam from the part of the alloy composition in powder form; and cooling the part of the alloy composition in powder form at a rate greater than or equal to approximately 105° C. per second, in order thus to form the metal aluminum alloy reinforced by dispersion. The method is particularly adapted for an alloy having a composition according to the following formula: $Al_{comp}Fe_aSi_bX_c$, wherein X represents at least one element chosen from the group consisting of Mn, V, Cr, Mo, W, Nb and Ta; a ranges from 2.0 to 7.5% atomic; b ranges from 0.5 to 3.0% atomic; c ranges from 0.05 to 3.5% atomic; and the remainder is aluminum and accidental impurities, provided that the ratio [Fe+Si]/Si is located in the range from approximately 2.0:1 to 5.0:1.

The patent application US 2017/0211168 discloses a method for manufacturing a lightweight strong alloy, with high performance at high temperature, comprising aluminum, silicon, iron and/or nickel.

The patent application EP 3026135 describes a casting alloy comprising 87 to 99 parts by weight of aluminum and silicon, 0.25 to 0.4 parts by weight of copper and 0.15 to 0.35 parts by weight of a combination of at least two elements from Mg, Ni and Ti. This casting alloy is suitable for being atomized by an inert gas in order to form a powder, the powder being used to form an object by laser additive manufacturing, the object next undergoing aging treatment.

The publication "Characterization of Al—Fe—V—Si heat-resistant aluminum alloy components fabricated by selective laser melting", Journal of Material Research, Vol. 30, No. 10, May 28, 2015, describes the manufacture by SLM of heat-resistant components with a composition, as a % by weight, Al-8.5Fe-1.3V-1.7Si.

The publication "Microstructure and mechanical properties of Al—Fe—V—Si aluminum alloy produced by electron beam melting", Materials Science & Engineering A659 (2016) 207-214, describes parts of the same alloy as in the previous article obtained by EBM.

There is an increasing demand for high-strength aluminum alloys for the SLM application. The 4xxx alloys (mainly Al10SiMg, Al7SiMg and Al12Si) are the most mature aluminum alloys for the SLM application. These alloys offer very good suitability for the SLM method but suffer from limited mechanical properties.

Scalmalloy® (DE 102007018123 A1) developed by APWorks offers (with post-manufacturing heat treatment of 4 hours at 325° C.) good mechanical properties at ambient temperature. However, this solution suffers from a high cost in powder form related to the high scandium content thereof (~0.7% Sc) and the need for a specific atomization process. This solution also suffers from poor mechanical properties at high temperature, for example above 150° C.

Addalloy™ developed by NanoAl (WO 2018/00935 A1) is an Al Mg Zr alloy. This alloy suffers from limited mechanical properties with a hardness peak of approximately 130 HV.

The mechanical properties of the aluminum parts obtained by additive manufacturing are dependent on the alloy forming the solder, and more precisely the composition thereof, the parameters of the additive manufacturing method and the heat treatments applied. The inventors have determined an alloy composition which, used in an additive manufacturing method, makes it possible to obtain parts having remarkable characteristics. In particular, the parts obtained according to the present invention have improved characteristics compared with the prior art (in particular an 8009 alloy), in particular in terms of hardness when hot (for example after 1 h at 400° C.).

SUMMARY

A first object of the invention is a method for manufacturing a part including a formation of successive solid metal layers, superimposed on one another, each layer describing a pattern defined from a digital model, each layer being formed by the deposition of a metal, referred to as a solder, the solder being subjected to an input of energy so as to melt and, in solidifying, to form said layer, wherein the solder is in the form of a powder, the exposure of which to an energetic beam results in melting followed by solidification so as to form a solid layer, the method being characterized in that the solder is an aluminum alloy comprising at least the following alloy elements:

Ni, in a proportion by mass of 1% to 6%, preferably 1 to 5.5%, more preferentially 2 to 5.5%;
Cr, in a proportion by mass of 1% to 7%, preferably 3 to 6.5%;
Zr, in a proportion by mass of 0.5 to 4%, preferably 1 to 3%;
Fe, in a proportion by mass of less than or equal to 1%, preferably 0.05 to 0.5%, more preferentially 0.1 to 0.3%;
Si, in a proportion by mass of less than or equal to 1%, preferably less than or equal to 0.5%.

It should be noted that the alloy according to the present invention may also comprise:

impurities in a proportion by mass of less than 0.05% each (that is to say 500 ppm) and less than 0.15% in total; the remainder being aluminum.

BRIEF DESCRIPTION OF THE DRAWINGS

FIGS. 1-3 depict embodiments as described herein.

DETAILED DESCRIPTION OF A PREFERRED EMBODIMENT

Preferably, the alloy according to the present invention comprises a proportion by mass of at least 85%, more preferentially at least 90% aluminum.

The melting of the powder may be partial or total. Preferably, from 50 to 100% of the powder exposed melts, more preferentially 80 to 100%.

Optionally, the alloy may also comprise Cu in a proportion by mass of 0 to 8%, preferably 0 to 6%.

Optionally, the alloy may also comprise at least one element chosen from: Ti, W, Nb, Ta, Y, Yb, Nd, Er, Hf, Ce, Sc, V, Co, La and/or mischmetal, in a proportion by mass of less than or equal to 5%, preferably less than or equal to 3% each, and less than or equal to 15%, preferably less than or equal to 12%, even more preferentially less than or equal to 5% in total. However, in one embodiment, the addition of Sc is avoided, the preferred proportion by mass of Sc then being less than 0.05%, and preferably less than 0.01%.

These elements may lead to the formation of dispersoids or fine intermetallic phases, making it possible to increase the hardness of the material obtained.

Optionally, the alloy may also comprise at least one element chosen from; Sr, Ba, Sb, Bi, Ca, P, B, In and/or Sn, in a proportion by mass of less than or equal to 1%, preferably less than or equal to 0.1%, even more preferentially less than or equal to 700 ppm each, and less than or equal to 2%, preferably less than or equal to 1% in total. However, in one embodiment, the addition of Bi is avoided, the preferred proportion by mass of Bi then being less than 0.05%, and preferably less than 0.01%.

Optionally, the alloy may also comprise at least one element chosen from: Ag in a proportion by mass of 0.06 to 1%, Li in a proportion by mass of 0.06 to 1%, and/or Zn in a proportion by mass of 0.06 to 1%. These elements may act on the strength of the material by hardening precipitation or through their effect on the properties of the solid solution.

Optionally, the alloy may also comprise Mg in a proportion by mass of at least 0.06% and no more than 0.5%. However, the addition of Mg is not recommended and the proportion of Mg is preferably maintained at an impurity value, that is to say less than 0.05% by mass.

Preferably, the Mn content is maintained at an impurity value, that is to say less than 0.05% by mass.

Optionally, the alloy may also comprise at least one element for refining the grains and preventing a coarse columnar microstructure, for example AlTiC or Al—TiB$_2$ (for example in AT5B or AT3B form), in a quantity less than or equal to 50 kg/tonne, preferably less than or equal to 20 kg/tonne, even more preferentially less than or equal to 12 kg/tonne each, and less than or equal to 50 kg/tonne, preferably less than or equal to 20 kg/tonne in total.

According to one embodiment, the method may include, following the formation of the layers:

solution heat treatment followed by quenching and aging, or
heat treatment typically at a temperature of at least 100° C. and no more than 400° C.,
and/or hot isostatic compression (HIC).

The heat treatment may in particular allow a sizing of the residual stresses and/or an additional precipitation of hardening phases.

The HIC treatment may in particular make it possible to improve the elongation properties and the fatigue properties. The hot isostatic compression may be performed before, after or instead of the heat treatment.

Advantageously, the hot isostatic compression is carried out at a temperature of 250° C. to 550° C., and preferably from 300° C. to 450° C., at a pressure of 500 to 3000 bar and for a period of 0.5 to 10 hours.

The heat treatment and/or the hot isostatic compression makes it possible in particular to increase the hardness of the product obtained.

According to another embodiment, adapted to structural-hardening alloys, it is possible to carry out a solution heat treatment followed by quenching and aging of the part formed and/or a hot isostatic compression. The hot isostatic compression may in this case advantageously be substituted for the solution heat treatment. However, the method according to the invention is advantageous since it preferably does not require solution heat treatment followed by quenching. Solution heat treatment may have a harmful effect on the mechanical strength in certain cases by participating in an enlarging of the dispersoids or of the fine intermetallic phases.

According to one embodiment, the method according to the present invention optionally further includes a machining treatment, and/or a chemical, electrochemical or mechanical surface treatment, and/or tribofinishing. These treatments may be carried out in particular in order to reduce the roughness and/or to improve the corrosion resistance and/or to improve the resistance to the initiation of fatigue cracks.

Optionally, it is possible to carry out a mechanical deformation of the part, for example after the additive manufacturing and/or before the heat treatment.

A second object of the invention is a metallic part, obtained by a method according to the first object of the invention.

A third object of the invention is a powder comprising, preferably consisting of, an aluminum alloy comprising at least the following alloy elements:

Ni, in a proportion by mass of 1% to 6%, preferably 1 to 5.5%, more preferentially 2 to 5.5%

Cr, in a proportion by mass of 1% to 7%, preferably 3 to 6.5%;

Zr, in a proportion by mass of 0.5 to 4%, preferably 1 to 3%;

Fe, in a proportion by mass of less than or equal to 1%, preferably 0.05 to 0.5%, more preferentially 0.1 to 0.3%;

Si, in a proportion by mass of less than or equal to 1%, preferably less than or equal to 0.5%.

It should be noted that the aluminum alloy of the powder according to the present invention may also comprise:

impurities in a proportion by mass of less than 0.05% each (that is to say 500 ppm) and less than 0.15% in total;

the remainder being aluminum.

Preferably, the alloy of the powder according to the present invention comprises a proportion by mass of at least 85%, more preferentially at least 90% aluminum.

The aluminum alloy of the powder according to the present invention may also comprise:

optionally Cu in a proportion by mass of 0 to 8%, preferably 0 to 6%; and/or optionally at least one element chosen from: Ti, W, Nb, Ta, Y, Yb, Nd, Er, Hf, Ce, Sc, V, Co, La and/or mischmetal, in a proportion by mass of less than or equal to 5%, preferably less than or equal to 3% each, and less than or equal to 15%, preferably less than or equal to 12%, even more preferentially less than or equal to 5% in total. However, in one embodiment, the addition of Sc is avoided, the preferred proportion by mass of Sc then being less than 0.05%, and preferably less than 0.01%; and/or optionally at least one element chosen from: Sr, Ba, Sb, Bi, Ca, P, B, In and/or Sn, in a proportion by mass of less than or equal to 1%, preferably less than or equal to 0.1%, even more preferentially less than or equal to 700 ppm each, and less than or equal to 2%, preferably less than or equal to 1% in total. However, in one embodiment, the addition of Bi is avoided, the preferred proportion by mass of Bi then being less than 0.05%, and preferably less than 0.01%; and/or optionally, at least one element chosen from: Ag in a proportion by mass of 0.06 to 1%, Li in a proportion by mass of 0.06 to 1%, and/or Zn in a proportion by mass of 0.06 to 1%; and/or optionally, Mg in a proportion by mass of at least 0.06% and no more than 0.5%. However, the addition of Mg is not recommended and the Mg content is preferably maintained at an impurity value, that is to say less than 0.05% by mass; and/or preferably, the proportion of Mn is maintained at an impurity value, that is to say less than 0.05% by mass; and/or optionally at least one element chosen so as to refine the grains and prevent a coarse columnar microstructure, for example AlTiC or $AlTiB_2$ (for example in AT5B or AT3B form), in a quantity of less than or equal to 50 kg/tonne, preferably less than or equal to 20 kg/tonne, even more preferentially less than or equal to 12 kg/tonne each, and less than or equal to 50 kg/tonne, preferably less than or equal to 20 kg/tonne in total.

Other advantages and features will emerge more clearly from the following description and the non-limitative examples, and shown in the figures listed below.

FIGURES

FIG. 1 is a diagram illustrating an additive manufacturing method of the SLM or EBM type.

FIG. 2 shows a micrograph of a cross section of an Al10Si0.3Mg sample after surface sweeping with a laser, cut and polished with two Knoop indentations in the re-melted layer.

FIG. 3 is a diagram of the sample used according to the examples.

DETAILED DESCRIPTION OF THE INVENTION

In the description, unless indicated otherwise:

the designation of the aluminum alloys is in accordance with the nomenclature established by the Aluminum Association;

the proportions of chemical elements are designated in % and represent proportions by mass.

FIG. 1 describes in general terms an embodiment wherein the additive manufacturing method according to the invention is implemented. According to this method, the filler material 25 is in the form of an alloy powder according to the invention. An energy source, for example a laser source or a source of electrons 31, emits a beam of energy, for example a laser beam or a beam of electrons 32. The energy source is coupled to the filler material by an optical system or a system of electromagnetic lenses 33, the movement of the beam thus being able to be determined according to a digital model M. The energy beam 32 follows a movement on a longitudinal plane XY, describing a pattern dependent on the digital model M. The powder 25 is deposited on a support 10. The interaction of the energy beam 32 with the powder 25 causes a selective melting of the latter, followed by a solidification, resulting in the formation of a layer $20_1 \ldots 20_n$. When a layer has been formed, it is covered with powder 25 of the solder and another layer is formed, superimposed on the layer previously produced. The thickness of the powder forming a layer may for example be from 10 to 100 μm. This additive manufacturing method is typically known by the name selective laser melting (SLM) when the energy beam is a laser beam, the method being in this case advantageously executed at atmospheric pressure, and by the name electron beam melting (EBM) when the energy beam is a beam of electrons, the method in this case advantageously being executed at a reduced pressure, typically less than 0.01 bar and preferably less than 0.1 mbar.

In another embodiment, the layer is obtained by selective laser sintering (SLS) or direct metal laser sintering (DMLS), the layer of alloy powder according to the invention being sintered selectively according to the digital model chosen with thermal energy supplied by a laser beam.

In yet another embodiment, not described by FIG. 1, the powder is sprayed and melted simultaneously by a beam, generally a laser beam. This method is known by the name laser melting deposition.

Other methods can be used, in particular those known by the names direct energy deposition (DED), direct metal deposition (DMD), direct laser deposition (DLD), laser deposition technology (LDT), laser metal deposition (LMD), laser engineering net shaping (LENS), laser cladding technology (LCT), or laser freeform manufacturing technology (LFMT).

In one embodiment, the method according to the invention is used for producing a hybrid part comprising a portion 10 obtained by conventional rolling and/or extrusion and/or casting and/or forging methods, optionally followed by machining, and an attached portion 20 obtained by additive manufacturing. This embodiment may also be suitable for repairing parts obtained by conventional methods.

It is also possible, in one embodiment of the invention, to use the method according to the invention for repairing parts obtained by additive manufacturing.

At the end of the formation of the successive layers, an untreated part or as-manufactured part is obtained.

The metal parts obtained by the method according to the invention are particularly advantageous since they have a hardness in the as-manufactured state lower than that of an 8009 reference, and at the same time a hardness after heat treatment superior to that of an 8009 reference. Thus, unlike the alloys according to the prior art such as the 8009 alloy, the hardness of the alloys according to the present invention increases between the as-manufactured state and the state after heat treatment. The lower hardness in the as-manufactured state of the alloys according to the present invention compared with an 8009 alloy is considered to be advantageous for suitability for the SLM method, by causing a lower stress level during the SLM manufacture and thus lower sensitivity to hot cracking. The greater hardness after heat treatment (for example one hour at 400° C.) of the alloys according to the present invention compared with an 8009 alloy affords better thermal stability. The heat treatment could be a hot isostatic compression (HIC) step post SLM manufacture. Thus the alloys according to the present invention are softer in the as-manufactured state but have better hardness after heat treatment, and hence better mechanical properties for the parts in service.

The HK0.05 Knoop hardness in the as-manufactured state of the metal parts obtained according to the present invention is preferably from 150 to 300 HK, more preferentially from 160 to 280 HK. Preferably, the HK0.05 Knoop hardness of the metal parts obtained according to the present invention, after heat treatment of at least 100° C. and no more than 550° C. and/or hot isostatic compression, for example after one hour at 400° C., is 160 to 330 HK, more preferentially 170 to 330 HK. The Knoop hardness measurement protocol is described in the following examples.

The powder according to the present invention can have at least one of the following characteristics:
  mean particle size from 5 to 100 μm, preferably from 5 to 25 μm, or from 20 to 60 μm. The values given mean that at least 80% of the particles have a mean size in the specified range;
  spherical shape. The sphericity of a powder can for example be determined using a morphogranulometer;
  good castability. The castability of a powder may for example be determined in accordance with ASTM B213 or ISO 4490:2018. According to ISO 4490:2018, the flow time is preferably less than 50 S;
  low porosity, preferably from 0 to 5%, more preferentially from 0 to 2%, even more preferentially from 0 to 1% by volume. The porosity can in particular be determined by scanning electron microscopy or by helium pycnometry (see ASTM 8923);
  absence or small quantity (less than 10%, preferably less than 5% by volume) of small particles (1 to 20% of the mean size of the powder), known as satellites, which stick to the larger particles.

The powder according to the present invention can be obtained by conventional atomization methods using an alloy according to the invention in liquid or solid form or, alternatively, the powder may be obtained by mixing primary powders before exposure to the energy beam, the various compositions of the primary powder having a mean composition corresponding to the composition of the alloy according to the invention.

It is also possible to add non-meltable insoluble particles, for example $TiB_2$ oxides or particles or carbon particles, in the bath before atomization of the powder and/or when the powder is deposited and/or when the primary powders are mixed. These particles can serve to refine the microstructure. They can also serve to harden the alloy if they are of nanometric size. These particles may be present in a proportion by volume of less than 30%, preferably less than 20%, more preferentially less than 10%.

The powder according to the present invention can be obtained for example by gas-jet atomization, plasma atomization, water-jet atomization, ultrasound atomization, centrifugation atomization, electrolysis and spheroidization, or grinding and spheroidization.

Preferably, the powder according to the present invention is obtained by gas-jet atomization.

The gas-jet atomization method commences with the pouring of a molten metal through a nozzle. The molten metal is then attacked by neutral gas jets, such as nitrogen or argon, and atomized in very small droplets, which cool and solidify while falling inside an atomization tower.

The powders are next collected in a can. The gas-jet atomization method has the advantage of producing a powder having a spherical shape, unlike water-jet atomization, which produces a powder having an irregular shape. Another advantage of gas-jet atomization is good powder density, in particular by virtue of the spherical shape and the size distribution of the particles. Yet another advantage of this method is good reproducibility of the particle size distribution.

After manufacture thereof, the powder according to the present invention can be stored, in particular in order to reduce the moisture level thereof. The powder can also be packaged and stored between manufacture and use thereof.

The powder according to the present invention can in particular be used in the following applications:
  selective laser sintering (SLS);
  direct metal laser sintering (DMLS);
  selective heat sintering (SHS);
  selective laser melting (SLM);
  electron beam melting (EBM);
  laser melting deposition;
  direct energy deposition (DED);
  direct metal deposition (DMD);
  direct laser deposition (DLD);
  laser deposition technology (LDT);
  laser engineering net shaping (LENS);
  laser cladding technology (LCT);
  laser freeform manufacturing technology (LFMT);
  laser metal deposition (LMD);

cold spray consolidation (CSC);
additive friction stir (AFS);
field assisted sintering technology (FAST) or spark plasma sintering; or
inertia rotary friction welding (IRFW).

The invention will be described in more detail in the following example.

The invention is not limited to the embodiments described in the above description or in the following examples, and may vary widely in the context of the invention as defined by the claims accompanying the present description.

EXAMPLES

Example 1

Two alloys according to the present invention, called Innov1 and Innov2, and an 8009 alloy of the prior art, were cast in a copper mold using an Induthem VC 650V machine for obtaining ingots 130 mm high, 95 mm wide and 5 mm thick. The composition of the alloys is given as a percentage proportion by mass in the following table 1.

TABLE 1

| Alloys | Si | Fe | V | Ni | Zr | Cr |
|---|---|---|---|---|---|---|
| Reference (8009) | 1.8 | 8.65 | 1.3 | — | — | — |
| Innov1 | — | 0.17 | — | 3 | 2 | 4 |
| Innov2 | — | 0.21 | — | 5 | 2 | 6 |

The alloys as described in table 1 above were tested by a fast prototyping method. Samples were machined for sweeping the surface with a laser, in the form of slices with dimensions 60×22×3 mm, from the ingots obtained above. The slices were placed in an SLM machine and the surface was swept with a laser following the same sweep strategy and method conditions representative of those used for the SLM method. It was in fact found that it was possible in this way to evaluate the suitability of the alloys for the SLM method and in particular the surface quality, sensitivity to hot cracking, hardness in the as-manufactured state and hardness after heat treatment.

Under the laser beam, the metal melts in a bath 10 to 350 μm thick. After the passage of the laser, the metal cools quickly as in the SLM method. After the laser sweeping, a fine surface layer 10 to 350 μm thick was melted and then solidified. The properties of the metal in this layer are similar to the properties of the metal at the core of a part manufactured by SLM, since the sweep parameters are judiciously chosen. The laser sweeping of the surface of the various samples was carried out using a ProX300 selective laser melting machine from 3DSystems. The laser source had a power of 250 W, the vector separation was 60 μm, the sweep speed was 300 mm/s and the diameter of the beam was 80 μm.

Measurement of Knoop Hardness

Hardness is an important property for alloys. This is because, if the hardness in the layer melted by sweeping the surface with a laser is high, a part manufactured with the same alloy would potentially have a high breaking point.

In order to assess the hardness of the melted layer, the slices obtained above were cut in the plane perpendicular to the direction of the laser passes and were then polished. After polishing, hardness measurements were carried out in the melted layer. The hardness measurement was made with a Durascan apparatus from Struers. The 50 g Knoop hardness method with the long diagonal of the indentation placed parallel to the plane of the melted layer was chosen so as to keep sufficient distance between the Indentation and the edge of the sample. Fifteen indentations were positioned halfway through the melted layer. FIG. 2 shows an example of the hardness measurement. The reference 1 corresponds to the melted layer and the reference 2 corresponds to a Knoop hardness indentation.

The hardness was measured on the Knoop scale with a 50 g load after laser treatment (in the as-manufactured state) and after additional heat treatment at 400° C. for variable periods making it possible in particular to evaluate the suitability of the alloy for hardening during a heat treatment and the effect of any HIC treatment on the mechanical properties.

The HK0.05 Knoop hardness values in the as-manufactured state and after various periods at 400° C. are given in table 2 below (HK0.05).

TABLE 2

| Alloy | As-manufactured state | After 1 h at 400° C. | After 4 h at 400° C. | After 10 h at 400° C. |
|---|---|---|---|---|
| Reference (8009) | 316 | 145 | 159 | 155 |
| Innov1 | 200 | 221 | 175 | 179 |
| Innov2 | 263 | 307 | 290 | 313 |

The alloys according to the present invention (Innov1 and Innov2) had an HK0.05 Knoop hardness in the as-manufactured state lower than that of the reference 8009 alloy but, after heat treatment at 400° C., superior to that of the reference 8009 alloy.

Moreover, the HK0.05 Knoop hardness of the alloy according to the present invention can be increased by the heat treatment of 1 h, or even 4 h and 10 h. On the other hand, the HK0.05 Knoop hardness of the 8009 reference was reduced by heat treatment. The response of the alloy according to the present invention to a heat treatment is thus improved compared with that of a reference 8009 alloy.

Table 2 above shows clearly the better thermal stability of the alloys according to the present invention compared with the reference 8009 alloy. This is because the hardness of the 8009 alloy dropped sharply as from the start of the heat treatment, and then reached a plateau. On the other hand, the hardness of the alloys according to the present invention first of all increased and then decreased gradually.

Finally, it was found, but not shown here, that adding Cu to the alloy according to the present invention can make it possible to further increase the HK0.05 hardness while keeping good thermal stability.

Example 2

An alloy according to the present invention having the composition as presented in Table 3 below, in percentages by mass, was cast in the form of an ingot.

TABLE 3

| Alloy | Cr | Ni | Zr |
|---|---|---|---|
| Innov3 | 4 | 3 | 12 |

The ingot was next transformed into powder by atomization using a VIGA (vacuum inert gas atomization) atomizer.

The particle size of the powder was measured by laser diffraction with a Malvern 2000 instrument and is given in Table 4 below, in µm.

TABLE 4

| Alloy | D10 | D90 |
|---|---|---|
| Innov3 | 11 | 50 |

The powder of the Innov3 alloy was used successfully for tests in accordance with the SLM technique using a FormUp 350 selective laser melting machine, sold by the company AddUp. These tests were performed with the following parameters: thickness of layer: 60 µm, power of the laser 370 W, heating of the plate to around 200° C., vector separation 0.13 mm, speed of the laser 1000 mm/s.

Cylindrical test pieces (45 mm high and 11 mm in diameter) were impressed for tensile tests in the construction direction Z (the most critical direction).

After manufacture by selective laser melting (SLM), the cylindrical test pieces of the Innov3 alloy underwent expansion heat treatment for two hours at 300° C.

Cylindrical traction test pieces, the characteristics of which are described in FIG. 3 and in Table 5 (in mm) below, were machined from the cylindrical test pieces described above. In FIG. 3 and Table 5, Ø represents the diameter of the central part of the test piece, M the width of the two ends of the test piece, LT the total length of the test piece, R the radius of curvature between the central part and the ends of the test piece, Lc the length of the central part of the test piece and F the length of the two ends of the test piece.

TABLE 5

| Type | Ø | M | LT | R | Lc | F |
|---|---|---|---|---|---|---|
| TOR 3 | 3 | 7 | 40 | 3 | 16.5 | 9 |

Tensile tests were carried out at ambient temperature in accordance with NF EN ISO 6892-1 (2009-10). The results obtained are presented in Table 6 below.

TABLE 6

| Alloy | Rp0.2 (MPa) | Rm (MPa) | A % |
|---|---|---|---|
| Innov3 | 447 | 471 | 1.2 |

The invention claimed is:

1. A method for manufacturing a part including a formation of successive solid metal layers, superimposed on one another, each layer including a pattern defined from a digital model (M), each layer being formed by a deposition of a metal, referred to as a solder, the solder being subjected to an input of energy so as to melt and, in solidifying, to form said layer, wherein the solder is in a form of a powder, an exposure of which to an energetic beam results in melting followed by solidification so as to form a solid layer, wherein the solder is an aluminum alloy consisting of the following alloy elements:
   Ni, in a proportion by mass of 1% to 6%;
   Cr, in a proportion by mass of 1% to 7%;
   Zr, in a proportion by mass of 0.5 to 4%;
   Fe, in a proportion by mass of 0.1 to 0.3%;
   Si, in a proportion by mass of less than or equal to 1%;
   optionally Cu in a proportion by mass of 0 to 8%;
   optionally at least one element chosen from: Ti, W, Nb, Ta, Y, Yb, Nd, Er, Hf, Ce, Sc, V, Co, La, in a proportion by mass of less than or equal to 5% each, and less than or equal to 15% in total;
   optionally at least one element chosen from: Sr, Ba, Sb, Bi, Ca, P, B, In and/or Sn, in a proportion by mass of less than or equal to 1% each, and less than or equal to 2% in total;
   optionally at least one element chosen from: Ag in a proportion by mass of 0.06 to 1%, Li in a proportion by mass of 0.06 to 1%, and/or Zn in a proportion by mass of 0.06 to 1%;
   optionally at least one compound for refining grains chosen from: AlTiC and Al—TiB$_2$;
   impurities in a proportion by mass of less than 0.05% each and less than 0.15% in total;
   the remainder being aluminum.

2. The method according to claim 1, wherein the proportion by mass of Cu is 0 to 6%.

3. The method according to claim 1, wherein the fraction by mass of at least one element chosen from: Ti, W, Nb, Ta, Y, Yb, Nd, Er, Hf, Ce, Sc, V, Co, and/or La is less than or equal to 3% each, and less than or equal to 12% in total.

4. The method according to claim 1, wherein the proportion by mass of at least one element chosen from: Sr, Ba, Sb, Bi, Ca, P, B, In and/or Sn is less than or equal to 0.1% each, and less than or equal to 1% in total.

5. The method according to claim 1, wherein the at least one compound for refining the grains chosen from: AlTiC and Al—TiB$_2$ is in a quantity of less than or equal to 50 kg/tonne each, and less than or equal to 50 kg/tonne in total.

6. The method according to claim 5, wherein the at least one compound for refining the grains chosen from: AlTiC and Al—TiB$_2$ is in a quantity of less than or equal to 20 kg/tonne each.

7. The method according to claim 1, comprising, following the formation of the layers:
   heat treatment, and/or
   hot isostatic compression.

8. The method according to claim 7, wherein the hot isostatic compression is carried out at a temperature of 250° C. to 550° C., at a pressure of 500 to 3000 bar and for a period of 0.5 to 10 hours.

9. The method according to claim 8, wherein the hot isostatic compression is carried out at a temperature of 300° C. to 450° C., at a pressure of 500 to 3000 bar and for a period of 0.5 to 10 hours.

10. The method according to claim 7, wherein the heat treatment is at a temperature of at least 100° C. and no more than 400° C.

11. The method according to claim 1, wherein 50-100% of the powder exposed melts.

12. The method according to claim 11, wherein 80-100% of the powder exposed melts.

13. The method according to claim 1, wherein the proportion by mass of Bi is less than 0.05%.

14. The method according to claim 1, further includes a machining treatment, and/or a chemical, electrochemical or mechanical surface treatment, and/or tribofinishing.

15. The method according to claim 1, wherein the proportion by mass of Ni is 1 to 5.5%.

16. The method according to claim 1, wherein the proportion by mass of Cr is 3 to 6.5%.

17. The method according to claim 1, wherein the proportion by mass of Zr is 1 to 3%.

18. The method according to claim 1, wherein the proportion by mass of Cu is 0%.

19. The method according to claim 1, wherein the solder is an aluminum alloy consisting of the following alloy elements:
- Ni, in a proportion by mass of 2% to 5.5%;
- Cr, in a proportion by mass of 3% to 6.5%;
- Zr, in a proportion by mass of 1 to 3%;
- Fe, in a proportion by mass of 0.1 to 0.3%;
- Si, in a proportion by mass of less than or equal to 0.5%;
- optionally Cu in a proportion by mass of 0 to 6%;
- optionally at least one element chosen from: Ti, W, Nb, Ta, Y, Yb, Nd, Er, Hf, Ce, Sc, V, Co, La, in a proportion by mass of less than or equal to 3% each, and less than or equal to 5% in total;
- optionally at least one element chosen from: Sr, Ba, Sb, Bi, Ca, P, B, In and/or Sn, in a proportion by mass of less than or equal to 700 ppm each, and less than or equal to 1% in total;
- optionally at least one element chosen from: Ag in a proportion by mass of 0.06 to 1%, Li in a proportion by mass of 0.06 to 1%, and/or Zn in a proportion by mass of 0.06 to 1%;
- optionally at least one compound for refining grains chosen from: AlTiC and Al—TiB$_2$;
- impurities in a proportion by mass of less than 0.05% each and less than 0.15% in total;
- the remainder being aluminum.

20. A powder consisting of an aluminum alloy consisting of:
- Ni, in a proportion by mass of 1% to 6%;
- Cr, in a proportion by mass of 1% to 7%;
- Zr, in a proportion by mass of 0.5 to 4%;
- Fe, in a proportion by mass of 0.1 to 0.3%;
- Si, in a proportion by mass of less than or equal to 1%;
- optionally Cu in a proportion by mass of 0 to 8%;
- optionally at least one element chosen from: Ti, W, Nb, Ta, Y, Yb, Nd, Er, Hf, Ce, Sc, V, Co, La, in accordance with a fraction by mass of less than or equal to 5% each, and less than or equal to 15% in total;
- optionally at least one element chosen from: Sr, Ba, Sb, Bi, Ca, P, B, In and/or Sn, in a proportion by mass of less than or equal to 1% each, and less than or equal to 2% in total;
- optionally at least one element chosen from: Ag in a proportion by mass of 0.06 to 1%, Li in a proportion by mass of 0.06 to 1%, and/or Zn in a proportion by mass of 0.06 to 1%;
- optionally at least one compound for refining grains chosen from: AlTiC and Al—TiB$_2$;
- impurities in a proportion by mass of less than 0.05% each and less than 0.15% in total;
- the remainder being aluminum.

* * * * *